United States Patent
Li et al.

(10) Patent No.: US 6,938,412 B2
(45) Date of Patent: Sep. 6, 2005

(54) REMOVING NITROGEN OXIDES DURING A LEAN-BURN ENGINE COLD START

(75) Inventors: Wei Li, Troy, MI (US); David R. Monroe, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/636,676

(22) Filed: Aug. 7, 2003

(65) Prior Publication Data

US 2005/0028518 A1 Feb. 10, 2005

(51) Int. Cl.$^7$ ................................................ F01N 3/10
(52) U.S. Cl. ..................... 60/300; 60/274; 60/285; 60/298; 123/198 F; 422/169; 422/177
(58) Field of Search ........................ 60/274, 285, 286, 60/298, 299, 300, 301, 302; 422/169, 171, 177, 180; 123/198 F, 481

(56) References Cited

U.S. PATENT DOCUMENTS

| | | | |
|---|---|---|---|
| 5,795,553 A | | 8/1998 | Lott et al. |
| 5,884,473 A | * | 3/1999 | Noda et al. .................. 60/274 |
| 5,910,293 A | * | 6/1999 | Hemingway et al. .... 423/213.7 |
| 5,974,794 A | * | 11/1999 | Gotoh et al. ................. 60/286 |
| 6,139,808 A | * | 10/2000 | Mizuno et al. ............. 422/180 |
| 6,265,342 B1 | * | 7/2001 | Lim et al. .................... 502/326 |
| 6,293,092 B1 | | 9/2001 | Ament et al. |
| 6,360,529 B1 | * | 3/2002 | Surnilla et al. ............... 60/274 |
| 6,370,871 B2 | * | 4/2002 | Suzuki et al. ................. 60/286 |
| 6,422,003 B1 | | 7/2002 | Ament et al. |
| 6,477,834 B1 | * | 11/2002 | Asanuma et al. ............. 60/285 |
| 6,539,709 B2 | * | 4/2003 | Kubo et al. ................. 60/301 |
| 6,557,342 B2 | * | 5/2003 | Suga et al. ................... 60/301 |
| 6,729,125 B2 | * | 5/2004 | Suga et al. ................... 60/285 |
| 6,742,327 B2 | * | 6/2004 | Inoue et al. .................. 60/285 |
| 2004/0226287 A1 | * | 11/2004 | Edgar et al. .................. 60/295 |

* cited by examiner

Primary Examiner—Tu M. Nguyen
(74) Attorney, Agent, or Firm—Kathryn A. Marra

(57) ABSTRACT

An apparatus and a method for removing NOx from an exhaust stream of a lean-burn engine during an engine cold start are provided. The apparatus includes a close-coupled LNT coupled to a main LNT by a hollow conduit. NOx from the cold exhaust is initially stored on the close-coupled LNT. As the engine exhaust warms up, the close-coupled LNT reaches its operating temperature and reduces the stored NOx to $N_2$. When the temperature of the close-coupled LNT reaches approximately 350° C., NOx is released from the close-coupled LNT, is absorbed on the main LNT, and is converted to $N_2$ during fuel-rich conditions, The close-coupled LNT can be regenerated after the engine is turned off by providing heat. The released NOx during the regeneration of the closed-coupled LNT is absorbed by the main LNT. The stored NOx on the main LNT can be reduced to $N_2$ during the next vehicle operation.

12 Claims, 4 Drawing Sheets

REMOVING NITROGEN OXIDES DURING A LEAN-BURN ENGINE COLD START

FIELD OF THE INVENTION

The present invention relates generally to the catalytic reduction of nitrogen oxides in engine exhaust, and more particularly to reducing emissions of NOx from an exhaust stream during a lean-burn engine cold start.

BACKGROUND OF THE INVENTION

Certain compounds in the exhaust stream of a combustion process, such as the exhaust stream from an internal combustion engine, are undesirable in that their release into the environment would contribute to lower air quality. As a result, they must be controlled in order to protect the environment and to meet or exceed government emissions regulations. Among such undesirable compounds are nitrogen oxides, which will be referred to as NOx. There are a wide variety of combustion processes that produce NOx, such as coal- or oil-fired furnaces, reciprocating internal combustion engines (including gasoline and diesel engines), and gas turbine engines. In each of these combustion processes, control measures to prevent or diminish atmospheric emissions of NOx are needed in order to improve air quality and comply with governmental regulations.

In order to remove pollutants (e.g., NOx, CO, and hydrocarbons) from an exhaust stream of an engine, catalytic converters containing three-way catalysts have been installed in automobiles. For most of the light-duty vehicles in US, the vehicle engines operate in a stoichiometric mode; i.e. stoichiometric amounts of fuel and air are fed into the engine and after combustion the exhaust stream contains roughly equal amount of residual oxygen and reductants (e.g., hydrocarbons, CO, and $H_2$). In these exhaust stream, the three-way catalysts are able to reduce NOx to $N_2$, and oxidize CO, $H_2$, and hydrocarbons to $CO_2$ and $H_2O$. However, in a fuel-rich exhaust, CO and hydrocarbons cannot be completely oxidized to $CO_2$ and $H_2O$ due to an insufficient amount of oxygen present in the exhaust. On the other hand, in a fuel-lean exhaust, NOx cannot completely reduced to $N_2$ due to an insufficient amount of reductants and an excess of oxygen in the exhaust.

Lean-burn engines typically operate in a fuel-lean mode; i.e. a more than stoichiometric amount of air is fed with fuel into the engine cylinders. Compared with stoichiometric engines, lean-burn engines offer superior fuel economy. One typical example of a lean-burn engine is a diesel engine. However, the fuel-lean exhaust stream from the lean-burn engines render the three-way catalytic converters inadequate in converting NOx to N2 and reducing tailpipe NOx emissions due to the reason mentioned above. Lean NOx traps, sometimes called LNT's, are considered to be one of the leading technologies for removing NOx from the exhaust stream of lean-burn engines. They contain catalysts that reduce NOx to $N_2$ and compounds (such as metal nitrates) that can store NOx as nitrates. However, LNT's operate most effectively within a temperature range of approximately 250–550° C., and undesirable emissions of NOx into the atmosphere are more likely to occur at temperatures outside that range. At temperatures below about 250° C., such as in an engine cold start, the LNT does not effectively convert NOx to nitrates (for storage) in a fuel-lean mode or convert released NOx to $N_2$ in a fuel-rich mode. When the LNT temperature is above approximately 550° C., the metal nitrates are not stable enough to store the NOx.

Therefore, despite efforts to develop a device or system effective for reducing NOx to nitrogen in a lean-burn engine (such as a diesel engine), the need for adequate conversion effectiveness has remained unsatisfied. Moreover, there is a continuing need for improved effectiveness in treating NOx emissions from any combustion process, but especially during an engine cold start.

SUMMARY OF THE INVENTION

An apparatus for selectively removing NOx from the exhaust stream of a lean-burn engine during an engine cold start is provided. The device includes a close-coupled LNT connected to a main LNT. The close-coupled LNT may be smaller in size than the main LNT. In addition, the close-coupled LNT may be positioned under the hood of the automobile and the main LNT may be positioned in an under-floor location (e.g., under the floor of the passenger compartment). The apparatus may further include an electrical heater to heat the close-coupled LNT to a temperature at which the close-coupled LNT will release any stored NOx, e.g., approximately 600° C. An air pump may also be provided to pump air to the close-coupled LNT.

A method for selectively removing NOx from the exhaust stream of a lean-burn engine during an engine cold start comprising passing the exhaust sequentially through a first (close-coupled) LNT and a second (main) LNT. The close-coupled LNT and the main LNT contain catalysts that catalyze reduction of NOx to $N_2$, and compounds that can store NOx as nitrates. During a cold start, NOx contained in the exhaust exiting the engine is initially stored on the close-coupled LNT. As the engine exhaust warms up, it heats the close-coupled and the main LNT. As the close-coupled LNT is heated above ambient by the hot exhaust gas, it reaches its catalytic temperature (typically 250°) and becomes catalytically active to convert NOx to $N_2$ when excess reductants (e.g., hydrocarbons, CO, or $H_2$) are available.

When the temperature of the close-coupled LNT is higher than about 350° C., the stored NOx can be released under both rich and lean modes. Under a fuel-rich mode, the released NOx is converted to N2 by the catalysts on the close-coupled LNT. Under a fuel-lean mode, the close-coupled LNT will also release the stored NOx. However, the released NOx may not be converted to N2 on the close-coupled LNT due to the lack of available reductants. Because the main LNT is located farther from the exhaust manifold of the engine than the close-coupled LNT, the temperature of the main LNT is generally lower than that of the close-coupled LNT. NOx released from the close-coupled LNT will be stored on the main LNT, where it can be reduced to $N_2$ during fuel-rich modes.

A method is also provided for reducing the total NOx released into the environment during operation of a vehicle containing a lean-burn engine. Cold start and engine operation are carried out as above. After the engine is turned off, the close-coupled LNT can be regenerated, such as by heating and by air provided by a heater and an air flow member, respectively. The heater on the close-coupled LNT and an air flow member, e.g., air pump, may be turned on for a brief period (e.g., 30 seconds) to heat the close-coupled LNT to a temperature where the closed-coupled LNT will release its absorbed NOx (e.g., approximately 600° C.). The NOx released during this regeneration of the closed-coupled LNT may be absorbed by the main LNT, thereby releasing little or no NOx into the atmosphere. The close-coupled LNT may then be permitted cool down in the air.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

It is known that internal combustion engines can operate in fuel-rich, stoichiometric, or fuel-lean modes in terms of a fuel-to-oxygen ratio. For example, when an engine operates in a fuel-rich mode, the exhaust stream contains excess reductants (e.g., fuel, CO, and H2) and little oxygen after combustion in the engine cylinders. On the other hand, when the engine operates in a fuel-lean mode, the exhaust stream contains excess oxygen and few reductants. When the engine operates in a stoichiometric mode, which is the conventional operating mode for gasoline engines, the exhaust stream contains an approximately equal amount of residual oxygen and reductants. For lean-burn engines, three-way catalytic converters cannot effectively remove NOx emissions from the fuel-lean exhaust. Therefore novel catalyst technologies such as the lean NOx traps are being developed to address this issue. For the LNTs to effectively remove NOx emissions, the engines operate mostly in a fuel-lean mode with excursions of operating in a fuel-rich mode. During the fuel-lean mode, NOx in the exhaust stream is absorbed by the LNTs to metal nitrates. During the fuel-rich mode, the nitrates decompose and release NOx. The released NOx is reduced to N2 in the rich exhaust by the excess reductants. Thus during both fuel-lean and fuel-rich modes, very little NOx passes through the LNT and into the tailpipe emissions. The operating temperature window for LNTs are typically between 250–550° C.

Before an engine is started, the LNT catalyst is at an ambient temperature. Once the engine is started, the catalyst is slowly heated by the hot exhaust gas from the engine. In the first several minutes, the catalyst temperature is substantially below 250° C., e.g., 50–150° C. This period, when an engine is started yet the catalyst is at a temperature below its operating temperature, is termed "cold start".

Figure 1:
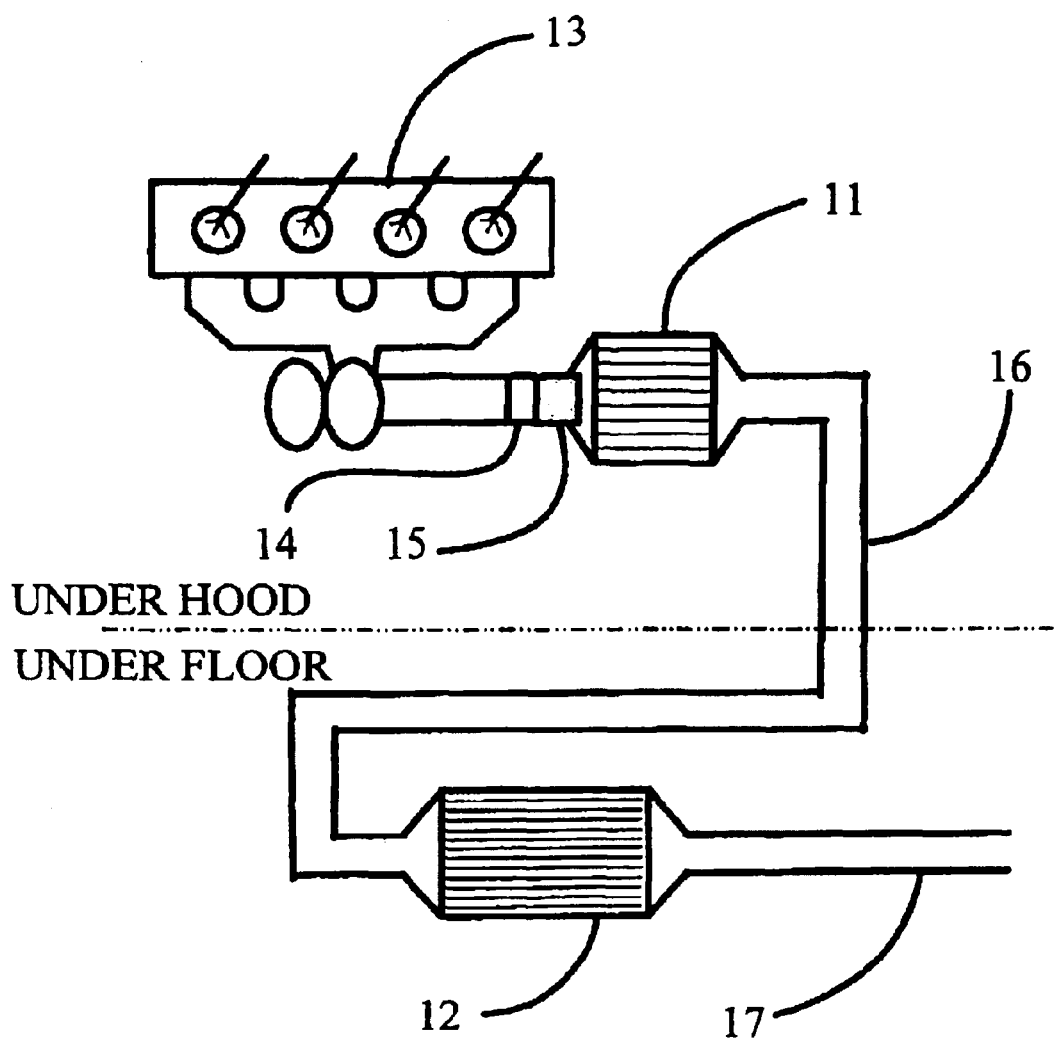
FIG. 1 is a schematic illustration of an apparatus for the removal of NOx according to one exemplary embodiment of the present invention.

Referring to FIG. 1, a schematic illustration of a device for removing NOx during such an engine cold start according to the present invention can be seen. In particular, the apparatus combines a close-coupled cold start LNT (lean NOx trap) 11 with a main LNT (lean NOx trap) 12. The close-coupled LNT 11 may be smaller in size than the main LNT 12. As shown in FIG. 1, the close-coupled LNT 11 may be positioned under the hood of an automobile and the main LNT 12 may be positioned under a floor of the automobile, e.g., under the floor of the passenger compartment. Thus, the main LNT 12 may be positioned at a location that is farther from the exhaust manifold of the engine than the close-coupled LNT 11. The close-coupled LNT 11 may be connected to the main LNT 12 by a hollow conduit 16 that permits the passage of an exhaust stream. During an engine cold start, e.g., when the catalyst temperature is below 250° C., exhaust from the engine 13 is directed to the cold start LNT 11. The NOx from the cold exhaust is stored in the close-coupled LNT 11 before the close-coupled LNT 11 and the main LNT 12 reach their respective operating temperatures, approximately 250–450° C. and approximately 250–500° C. respectively. The stored NOx will not be released from the close-coupled LNT 11 under a fuel-lean mode until the close-coupled LNT 11 reaches approximately 350° C. Therefore, when the temperature of the close-coupled LNT 11 is between 250 and 350° C., the stored NOx will only be released under a fuel-rich mode where excess reductants (e.g., hydrocarbons, CO, or H2) are available. Because the close-coupled LNT 11 is catalytically active at these temperatures, close-coupled LNT 11 reduces the released NOx to N2.

When the temperature of the close-coupled LNT is higher than 350° C., the stored NOx can be released under both fuel-rich and fuel-lean modes. Under a fuel-rich mode, the released NOx is converted to N2 by the catalysts on the close-coupled LNT. Under a fuel-lean mode, the close-coupled LNT will also release the stored NOx. However, the released NOx will not be converted to N2 on the close-coupled LNT due to the lack of available reductants. Because the main LNT is located farther from the exhaust manifold of the engine than the close-coupled LNT, the temperature of the main LNT is lower than the close-coupled LNT and, as a result, the released NOx will be stored on the main LNT and will be reduced to N2 during fuel-rich modes.

Once the close-coupled LNT 11 reaches an operating temperature corresponding to an effective catalytic temperature (e.g., approximately 250–450° C.), the engine 13 may operate in a fuel-lean mode with periodic operation in a fuel-rich mode to convert the NOx stored on the close-coupled LNT 11 to N2. For example, the engine 13 may operate in a lean-rich cyclic operation mode such as, but not limited to 30 seconds lean/2 seconds rich. During the fuel-rich mode, the exhaust from engine 13 has a low oxygen content and a high content of reductants such as CO and H2. These reductants can reduce the NOx stored on the close-coupled LNT 11 to nitrogen (N2). Under fuel-rich conditions, any NOx released from the close-coupled LNT 11 that has not been converted by the reductants is absorbed on the main LNT 12 since the main LNT 12 is at a lower temperature than the close-coupled LNT 11. As a result, there is very little, if any, NOx released from the main LNT 12 through the tailpipe 17 and into the environment.

Before an engine cold start, the close-coupled LNT 11 has a high NOx storage capacity. However, after the engine 13 has been turned on and the close-coupled LNT 11 has been used to store NOx and convert the stored NOx to $N_2$, the close-coupled LNT 11 has a reduced storage capacity for NOx. Therefore, the close-coupled LNT 11 may be regenerated after each use. In one embodiment, the close-coupled LNT such as illustrated in FIG. 1 may be regenerated by heating above a temperature at which the compounds in the LNT release NOx. In FIG. 1 for example, to regenerate the close-coupled LNT 11, the engine 13 is turned off, and a heater 15 (e.g., electrical heater) on the close-coupled LNT 11 and an air flow member 14 (e.g., air pump) is turned on for a brief period, e.g. 30 seconds. Because the NOx are stored on the LNTs 11 and 12 as nitrates, they decompose at elevated temperatures and release NOx. Thus, when the close-coupled LNT 11 is heated by the heater 15, the close-coupled LNT 11 releases its stored NOx. The released NOx is then absorbed by the main LNT 12. The absorbed NOx is subsequently reduced to N2 during the next vehicle operation. Because the NOx released from the close-coupled LNT 11 is absorbed by the main LNT 12, there is a minimal, if any, release of NOx through main LNT 12 during this regeneration of the NOx storage capacity for the close-coupled LNT 11. In addition, the close-coupled LNT 11 will have sufficient storage capacity for the next engine cold start.

Figure 2:
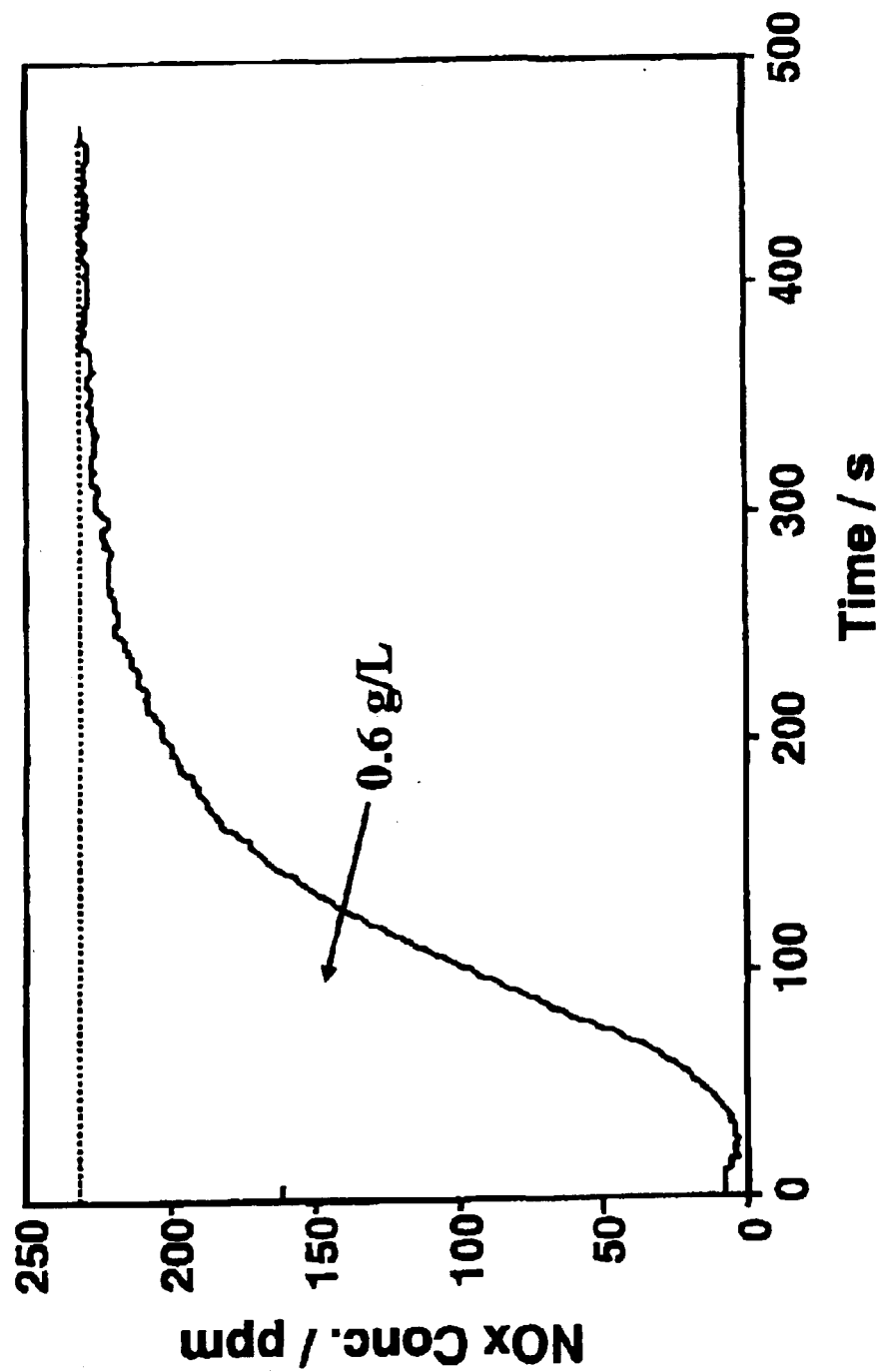
FIG. 2 is a graphical illustration of the NOx concentration at the exit of a main lean NOx trap (main LNT) with a lean exhaust feed that contains 250 ppm of NO during a NOx storage capacity measurement at 150° C.

Each LNT catalyst has a fixed capacity for NOx storage, which corresponds to the amount of NOx storage components (e.g., alkali metal, alkaline earth metals, and/or rare earth metals) in the catalyst. When the catalyst is saturated, e.g., when all the NOx storage components have been converted to nitrates by NOx, the LNT can no longer store NOx. Ideally, before this full storage capacity is reached, the exhaust exiting the LNT should contain no NOx, i.e., zero NOx breakthrough. However, as shown in FIG. 2, even when the close-coupled LNT catalyst has a 50% storage capacity, the exit NOx concentration, i.e., the NOx breakthrough, approaches 60% of the inlet NOx concentration at 150° C. This NOx breakthrough indicates that the LNT can only store approximately 40% of the incoming NOx even when it still has about 50% NOx storage capacity.

Consequently, in order for a close-coupled LNT to have a low NOx breakthrough and to efficiently reduce NOx emissions during engine cold starts, the close-coupled LNT should retain most of its NOx storage capacity. As a result, in a preferred embodiment of the present invention, the close-coupled LNT 11 is regenerated before each engine cold start. The regeneration process converts the stored metal nitrates to metal oxides, carbonates, or hydroxides, and can be conducted in both fuel-rich and fuel-lean exhausts. The regeneration in a fuel-rich exhaust can be carried out at lower temperatures. However, at 150° C., the close-coupled LNT 11 recovered only about 50% of it capacity after regenerating for 1 minute in a fuel-rich exhaust (see FIG. 4). In a fuel-lean exhaust, the close-coupled LNT recovered its full storage capacity after a 30-second regeneration at 600° C. (see FIG. 4). To ensure that the regenerated close-coupled LNT retains its full storage capacity, it should be cooled down in a NOx-free exhaust.

Both the close-coupled LNT 11 and main LNT 12 can be made of a honeycomb-like substrate with the inner walls coated with at least one catalyst. The catalysts typically contain noble metals (e.g., Pt, Pd, and/or Rh), and NOx storage materials including, but not limited to, oxides, hydroxide, and/or carbonates of alkali metals (e.g., Li, Na, or K), alkali earth metals (e.g., Ca, Sr, or Ba), or lanthanum group metals (e.g., La, Ce, etc.), compounds containing elements that form stable nitrates (e.g., alkali metal, alkaline earth metals, and/or rare earth metals), or a combination of such elements.

In a fuel-lean mode, NOx in the exhaust is oxidized and stored as nitrates on the LNT catalyst. The stored NOx can be released under both fuel-rich and fuel-lean conditions depending the catalyst temperature and the catalyst formulation. For example, barium is a commonly used component in NOx storage catalysts. Barium nitrate is stable in a fuel-lean exhaust at temperatures up to approximately 600° C. However, barium nitrate will decompose and release NOx at temperatures as low as 250° C. in a fuel-rich exhaust. Therefore, under normal operating conditions for lean burn engines, an LNT will not release NOx during a lean mode because the exhaust temperature is typically below 600° C. The released NOx will remain NOx in a fuel-lean exhaust or in a fuel-rich exhaust before the LNT reaches its operating temperature range, e.g., 250–550° C. Further, the released NOx will be converted to N2 by the LNT in a rich exhaust when the LNT reaches its operating temperature.

Having generally described this invention, a further understanding can be obtained by reference to certain specific examples illustrated below which are provided for purposes of illustration only and are not intended to be all inclusive or limiting unless otherwise specified.

Table 1 set forth below shows the experimental conditions for the following examples. The total flow rate was 6 liters per minute.

TABLE 1

| | Feed Composition | |
|---|---|---|
| | Lean | Rich |
| $O_2$ | 10% | 0 |
| CO | 0 | 3.6% |
| NO | 250 ppm | 0 or 60 ppm |
| $H_2$ | 0 | 1.2% |
| HC | 0 | 200 ppm |
| $H_2O$ | 5% | 5% |
| $CO_2$ | 5% | 5% |

EXAMPLE 1

Referring to FIG. 2, the NOx concentration profile at the exit of a main LNT with a fuel-lean air feed that contains 250 ppm of NO during a storage capacity measurement at 150° C. can be seen. At time 0, a gas stream was switched from a fuel-rich feed containing no NO to a fuel-lean air feed containing approximately 250 ppm of NO. The difference between the exit NOx concentration and the inlet NOx concentration (250 ppm), which was measured with a chemiluminescence NOx analyzer, corresponds to the amount of NOx absorbed by the catalyst. A blank cordierite sample was used to correct for the flow dynamics. Integrating the difference between the outlet NOx concentrations after the blank cordierite and the catalyst with time yields the total amount of NO absorbed by the catalyst, i.e. yields the storage capacity.

After about 200 seconds, the outlet NOx concentration approached, but did not reach the inlet NOx concentration, e.g., the outlet NOx almost reached 250 ppm. This result suggests that although the majority of the storage of NOx was completed in the first 200 seconds of the measurement, there was an additional, although much slower storage process of NOx that continued to occur after the first 200 seconds had passed. Although not wishing to be bound by theory, this additional storage process may be due to NOx absorption on the alumina support. However, because this is a much slower process, it plays a relatively insignificant role in the ability of the LNTs to remove NOx from an engine exhaust stream during an engine cold start.

Figure 3:
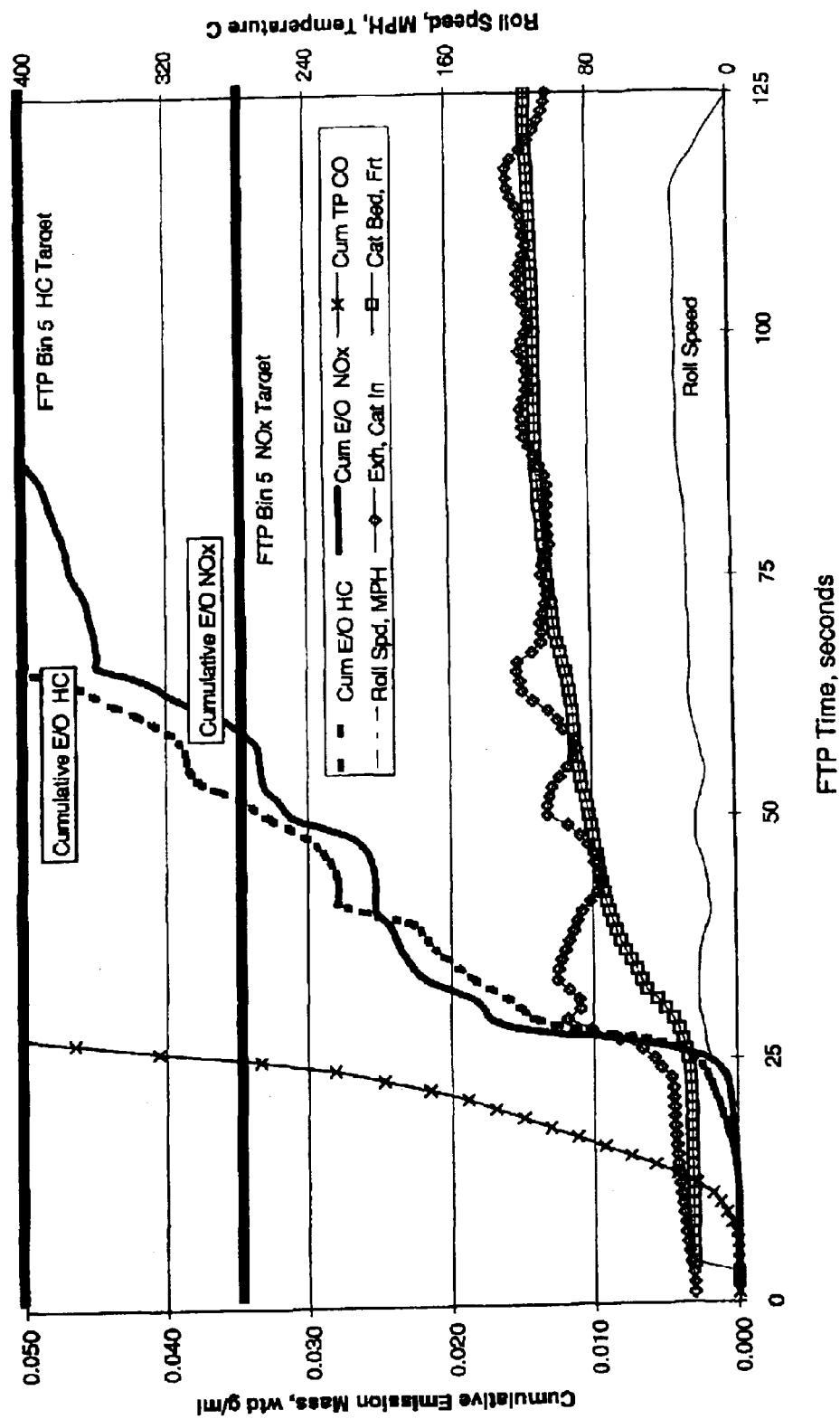
FIG. 3 is a graphical illustration of an engine out emission and temperature data during cycle 1 of a cold start FTP (U.S. Federal Test Procedure)

Using an estimate of the amount of NOx absorbed, excluding the contribution from the slower NOx absorption, the storage capacity was calculated to be approximately 0.6 gram NO/L catalyst. On the other hand, during an FTP (U.S. Federal Test Procedure) driving cycle, the cumulative NOx engine-out emission during a cold start (e.g., less than approximately 200° C.) for a 4.9 L engine was determined to be approximately 0.1–0.2 grams (see FIG. 3). As shown in FIG. 3, a significant NOx breakthrough started to occur only after the first 50 seconds of the measurement when about 50% of the storage capacity of the LNT had been consumed. This indicates that a reasonably sized LNT (e.g., greater than 1 liter) may have enough storage capacity to remove NOx emissions from an engine exhaust during a cold start. However, it is preferable that the LNT maintain greater than 50% of the original storage capacity in order to avoid significant NOx breakthrough.

EXAMPLE 2

Figure 4:
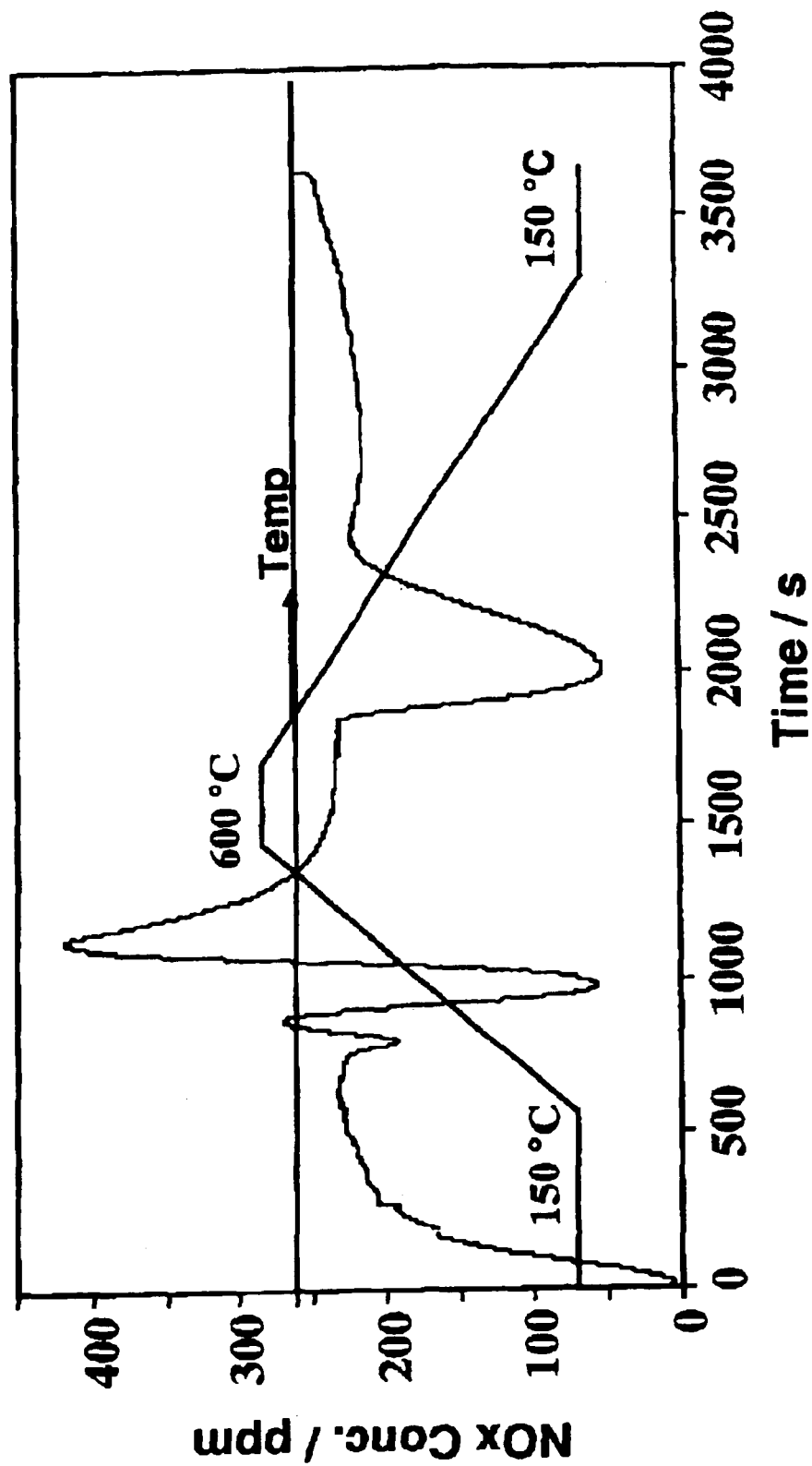
FIG. 4 is a graphical illustration of the NOx concentration at the exit of a main lean NOx trap (main LNT) with a lean exhaust feed that contains 250 ppm of NO during a NOx storage capacity measurement at 150° C., a temperature ramp up to approximately 600° C., and subsequent cool down to 150° C.

Referring now to FIG. 4, the exit NOx concentration during a storage capacity measurement at 150° C. and a subsequent temperature ramp to 600° C. in the fuel-lean feed can be seen. The composition of the fuel-lean exhaust feed is set forth in Table 1 above. After the close-coupled LNT was saturated with NOx at 150° C., the temperature was gradually increased to 600° C. During the heating, additional NOx storage occurred with a small absorption peak at approximately 250° C., followed by a much larger absorption peak at approximately 330° C. Although not wishing to be bound by theory, the small absorption peak at 250° C. may be due to a minor storage component in the catalyst, and the larger absorption peak at 330° C. may be due to the formation of barium nitrate. At 350° C., the LNT began to release the stored NOx. As shown in FIG. 4, a peak release of NOx occurred at approximately 420° C. At approximately 600° C., the exit NOx concentration returned to the level of the inlet NOx concentration, indicating that the LNT no longer stores or releases NOx at 600° C. The equal inlet/outlet concentration of NOx at 600° C. indicates that the NOx storage capacity of the LNT can be thermally regenerated in fuel-lean exhaust feeds.

To verify that LNTs restore their storage capacity after a high temperature regeneration, the LNT was cooled to 150° C. in a fuel-lean exhaust feed containing approximately 250 ppm NO following a regeneration at 600° C. (see FIG. 4). It was determined that although the LNT was fully regenerated, its storage capacity was completely consumed during the cooling process in the temperature range of approximately 350–500° C. Therefore, very little, if any, storage capacity remained at 150° C. In order to maintain the NOx storage capacity of the LNT, the LNTs are preferably cooled down in a NOx-free gas stream after a high-temperature thermal regeneration in a fuel-lean gas stream.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A method for the selective removal of NOx from a gaseous stream using lean NOx traps containing a catalyst that catalyzes the reduction of NOx to $N_2$ and a compound that stores NOx as nitrates, comprising:
   heating a first lean trap to a temperature at which stored nitrates decompose and are released;
   cooling the first lean NOx trap in an environment that does not contain NOx;
   passing the gaseous stream through the first lean NOx trap; and
   passing the gaseous stream through a second lean NOx trap, the second lean NOx trap storing NOx released from the first lean NOx trap.

2. The method of claim 1, comprising passing the gaseous stream through the first lean NOx trap at a temperature below 250° C.

3. A method according to claim 1, comprising passing the gaseous stream through the first lean NOx trap at a temperature below 140° C.

4. The method of claim 1, comprising passing the gaseous stream through the first lean NOx trap at a temperature below 200° C.

5. The method of claim 4, wherein the temperature in the heating step is approximately 600° C.

6. A method for reducing the total NOx released into the environment during operation from cold start to shut down of a vehicle containing an internal combustion engine comprising:
   operating the engine to produce an exhaust stream comprising NOx;
   passing the exhaust stream comprising NOx from the engine sequentially through a first LNT and a second LNT, wherein the LNTs comprise a catalyst that can cayalyze the reduction of NOx to $N_2$ and compounds that can store NOx as nitrates;
   shutting off the engine; and
   after shutting off the engine, regenerating the first LNT by heating it to a temperature at which it releases stored NOx.

7. A method according to claim 6, comprising operating the internal combustion engine with alternating cycles of rich and lean fuel.

8. A method according to claim 6, further comprising cooling the LNT in an environment that does not contain NOx.

9. A method according to claim 6, wherein the engine is a diesel engine.

10. A method according to claim 6, wherein the engine is a gasoline engine.

11. A method according to claim 6, wherein regenerating the first LNT comprises heating it to 600° C.

12. A method according to claim 11 wherein the heating step is carried out for about 30 seconds.

* * * * *